(12) United States Patent
Boe et al.

(10) Patent No.: US 7,670,394 B2
(45) Date of Patent: *Mar. 2, 2010

(54) COMPACT REFORMING REACTOR

(75) Inventors: Michael Boe, Klampenborg (DK); John Bøgild Hansen, Copenhagen (DK)

(73) Assignee: Haldor Topsoe A/S, Lyngby (DK)

( * ) Notice: Subject to any disclaimer, the term of this patent is extended or adjusted under 35 U.S.C. 154(b) by 622 days.

This patent is subject to a terminal disclaimer.

(21) Appl. No.: 11/471,574

(22) Filed: Jun. 21, 2006

(65) Prior Publication Data
US 2007/0000174 A1    Jan. 4, 2007

Related U.S. Application Data

(63) Continuation-in-part of application No. 11/167,591, filed on Jun. 28, 2005.

(51) Int. Cl.
*B01J 8/00* (2006.01)
*C10J 3/46* (2006.01)
(52) U.S. Cl. .................................. 48/197 R; 48/127.9
(58) Field of Classification Search .................. 48/197, 48/127.9
See application file for complete search history.

(56) References Cited

U.S. PATENT DOCUMENTS

| 3,541,729 | A |   | 11/1970 | Dantowitz |            |
|-----------|---|---|---------|-----------|------------|
| 3,617,227 | A | * | 11/1971 | Beggs     | 422/204    |
| 4,547,356 | A | * | 10/1985 | Papineau  | 423/658    |
| 4,666,680 | A | * | 5/1987  | Lewis     | 422/191    |
| 4,681,347 | A |   | 8/1989  | Szydiowski et al. |    |
| 5,048,284 | A | * | 9/1991  | Lywood et al. | 60/780 |
| 2003/0083196 | A1 | * | 5/2003 | Korotkikh et al. | 502/326 |
| 2004/0126288 | A1 | * | 7/2004 | Fuju et al. | 422/202 |
| 2005/0049318 | A1 | * | 3/2005 | Minkkinen et al. | 518/726 |

FOREIGN PATENT DOCUMENTS

| JP | 63-248702   | 10/1988 |
| WO | WO 01/55027 | 8/2001  |
| WO | WO 02/00548 | 1/2002  |

OTHER PUBLICATIONS

H. G. Dusterwald, et al. "Methanol Steam-Reforming in a Catalytic Fixed Bed Reactor", Chem. Eng. Technol. 20, 1997, pp. 617-623.

* cited by examiner

*Primary Examiner*—Jennifer K Michener
*Assistant Examiner*—Imran Akram
(74) *Attorney, Agent, or Firm*—Dickstein Shapiro LLP

(57) ABSTRACT

Reforming reactor for the conversion of a process fluid into hydrogen comprising:
a reforming section and a boiler section which are both contained within a common volume and a combustion section, in which said reforming section contains one or more catalyst tubes filled with reforming catalyst, said boiler section is provided with one or more tubes carrying flue gas from the combustion section and said combustion section is provided with at least one burner, wherein the heat exchanging medium required for the reforming of said process fluid in the one or more catalyst tubes is a gas-liquid mixture that self-circulates and is encapsulated inside said common volume containing said reforming and boiler sections.

8 Claims, 1 Drawing Sheet

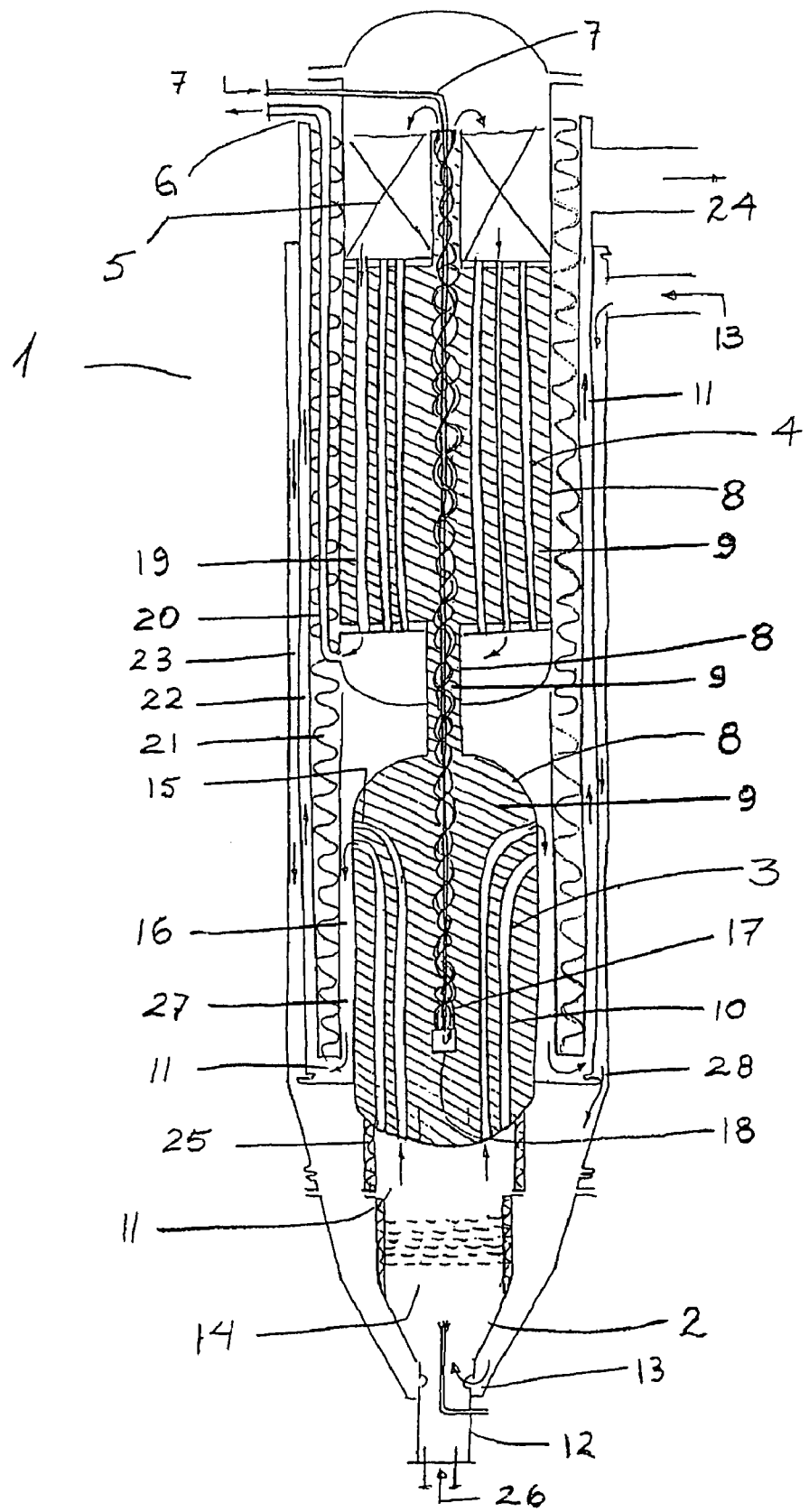

COMPACT REFORMING REACTOR

This is a continuation-in-part of U.S. application Ser. No. 11/167,591, filed on Jun. 28, 2005, the entire disclosure of which is incorporated by reference herein.

FIELD OF THE INVENTION

This invention relates to an integrated and compact reforming reactor for the production of hydrogen to be used in industrial applications such as in the metallurgical industry, chemical and pharmaceutical industry and fuel cell power plants. In particular the invention relates to a compact reforming reactor for the conversion of hydrocarbon feedstocks to hydrogen where the reformed gas of the reactor is further enriched in hydrogen by passage through a Pressure Adsorption Swing (PSA) unit, a Pd-alloy membrane, water-gas shift unit or by Preferential Oxidation (PROX). More particularly the invention relates to a compact reforming reactor for the conversion of methanol to a hydrogen gas suitable for use in fuel cell plants, especially where the reformed gas of the reactor is further enriched in hydrogen by passage through a PSA unit. The invention further involves a process for reforming the hydrocarbon feedstock into a hydrogen gas using this reactor.

BACKGROUND OF THE INVENTION

Fuel cell plants require often the supply of hydrogen as fuel source and accordingly a reforming reactor is normally integrated in fuel cell plants. The reforming reactor converts a suitable hydrocarbon feedstock acting as energy carrier, such as methane, liquid petroleum gas, gasoline, diesel or methanol, into a hydrogen rich gas, which then may be passed through a hydrogen-enrichment unit before entering a fuel cell assembly. Compact fuel cell power plants may today provide about 20 kW of power and even more, for instance up to 50 kW, thereby promoting a wide range of applications. One such application is the use of compact fuel cell plants in the automotive industry.

For widespread application, methanol is still regarded as the best hydrocarbon feedstock for the production of hydrogen-rich gas not only in connection with fuel cell plants but also for application in small plants in other industrial fields. Roughly, methanol is particularly suitable where the demand for hydrogen is the range 50-500 $Nm^3/h$, which is typical for small plants. For a hydrogen demand of above 500 $Nm^3/h$ a hydrocarbon feedstock such as natural gas is often more expedient. Below 50 $Nm^3/h$ electrolysis or bottled hydrogen is normally more expedient.

Reactors for the reforming of fuel gases, particularly methanol, and which are used in fuel cell plants are known in the art. Düsterwald et al. disclose in Chem. Eng. Technol. 20 (1997) 617-623 a methanol steam reformer consisting of four reactor tubes that are individually balanced. Each reactor tube consists of two stainless tubes arranged concentrically with catalyst filling the inner tube and in which the heat needed for the endothermic reaction of a methanol-water mixture is provided by condensing steam that flows in the gap between the tubes. It is also known from U.S. Pat. No. 4,861,347 to oxidise a raw fuel such as methanol in order to obtain an exothermic reaction, whereby the heat generated by this reaction is used for the endothermic reforming reaction of the hydrocarbon feedstock, which is normally a mixture of methanol and water. The heat is transferred from the combustion section of the reactor to its reforming section by means of heat tubes through which a hot flue gas from the combustion section is passed or as in JP-A-63248702 by means of heat pipes arranged in the reactor. As a result, the heat generated in the combustion system can be evenly distributed to the rest of the reactor, whereby a uniform temperature distribution is obtained.

Often the heat transfer system in the reforming reactor is not rapid enough to achieve the desired operating temperature after changes in process conditions such as after sudden load changes or during start-ups and shut-downs, especially when separate heat pipes are provided in the reforming reactor. Normally a number of more or less sequential steps are required for the start-up of the reforming reactor resulting in a procedure that may be significantly tedious and time-consuming.

In the particular field of fuel cells, the advent of fuel cells with increased power, for instance of up to 20 kW or even more, for instance up to 50 kW has resulted in a need for providing a plurality of catalyst tubes in a single reforming reactor. This in turn imposes more demands in reactor design in terms of i.a. compactness, better temperature distribution and thermal efficiency. In particular, the provision of a uniform temperature distribution by which all catalyst tubes inside the reactor are heated to the same temperature becomes more difficult to achieve when the heating required in reforming has to be provided by means of a single burner in the reactor.

In addition, the catalyst within the catalyst tubes may often be not evenly distributed so that the catalyst may for instance be better packed in some tubes than others. This may create undesired variation in temperature conditions across the catalyst tubes.

SUMMARY OF THE INVENTION

It is therefore an object of the invention to provide a reforming reactor with improved temperature distribution across all catalyst tubes.

It is also an object of the invention to provide a reforming reactor which is compact and free for mechanical means for circulating a heat exchanging medium from the high temperature section of the reactor to the reforming section of the reactor.

It is a further object of the invention to provide a reforming reactor which is compact whilst at the same time is able to rapidly and simply achieve or maintain its operating temperature after a change in process conditions, such as a change in hydrocarbon feed flow or temperature or a change in burner conditions or during a start-up operation.

It is another object of the invention to provide a reforming reactor which is less sensitive to divergent catalyst packing across the catalyst tubes.

It is another object of the invention to provide a reforming reactor which is simple in its construction, inexpensive and with lower heat loss than in conventional reforming reactors.

It is yet another object of the invention to provide a reforming reactor which is compact and suitable for use in fuel cell plants, particularly for fuel cell plants capable of producing up to 20 kW of power or even more for instance up to 50 kW.

These and other objects are achieved by the reactor and process of the invention.

In a first aspect of the invention we provide a reforming reactor for the conversion of a process fluid into hydrogen comprising: a reforming section and a boiler section which are both contained within a common volume and a combustion section, in which said reforming section contains one or more catalyst tubes filled with reforming catalyst, said boiler section is provided with one or more tubes carrying flue gas from the combustion section and said combustion section is provided with at least one burner, wherein the heat exchanging medium required for the reforming of said process fluid in the one or more catalyst tubes is a gas-liquid mixture that self-circulates and is encapsulated inside said common volume containing said reforming and boiler sections.

Accordingly, in the invention a gas-liquid mixture circulating outside the catalyst tubes in the reforming section and outside the tubes carrying the flue gas in the boiler section provides for a large heat sink that enables the accumulation and supply of heat for the reforming reaction so that all metal parts within the reactor, particularly the catalyst tubes, maintain or rapidly reach the same temperature, and a robust operation of the reactor is obtained as it becomes i.a. less sensitive to temporary changes in process conditions, such as changes in burner duty.

By the term "self-circulates" it is meant that the gas-liquid mixture acting as heat exchanging medium moves internally in the reactor without the need of any mechanical means. The gas flows to surfaces or catalyst tube walls, where condensation takes place in a movement driven by the slightly lower pressure created by the volume reduction of the gas as it transforms into liquid. Liquid flows then to the boiler section driven by gravity forces.

In the reactor of the invention at least one process feed tube carrying the process fluid to be converted, such as a liquid mixture of methanol and water, may extend inside said common volume of the reactor. Accordingly, the at least one process feed tube may extend into any location inside said common volume containing the reforming and boiler section, for example the at least one process feed tube may extend from a region at the top of the reactor and above the reforming section into this reforming section or even further into the boiler section arranged below. The at least one process feed tube carrying the process fluid to be converted is introduced to the reactor through a conduct in the outer wall of the reactor and may then extend into the reactor from said conduct arranged in the outer wall. Preferably said process feed tube extends substantially co-axially of the reactor wall inside said common volume from the reforming section of the reactor to the boiler section of the reactor. This enables the provision of a compact reactor as the at least one process feed tube, for example a single substantially straight tube or a tube bundle, is advantageously integrated within the reactor whereby the pre-heating or evaporation of the process fluid can advantageously be effected as the gas in the self-circulating gas-liquid mixture outside the tube condenses. Hence it is possible to integrate the required evaporation stage inside the reactor thus avoiding the inexpedient provision of separate evaporation means outside the reactor.

By the term "extends substantially co-axially" it is meant that a portion of the process feed tube, particularly the inlet portion cooperating with the conduct in the outer wall of the reactor, may extend into the center of the reactor in a direction which is perpendicular to the reactor length axis, thereafter bending 90° and consequently extending vertically into the reforming section or boiler section below.

The at least one process feed tube may extend vertically into a transition compartment from which at least one process tube carrying process gas to be converted extends vertically upwards inside the common volume of the reactor and wherein the at least one process tube carrying the process gas is formed as a coil. Preferably, a single process tube descends from the conduct in the outer wall where the hydrocarbon feed for example a liquid hydrocarbon feed enters the reactor to the transition compartment. The transition compartment is arranged as a box having inlet openings adapted to accommodate the at least one process tube carrying a process fluid present in substantially liquid form and outlet openings adapted to accommodate the at least one process tube carrying a process fluid present in substantially gas form. These tubes extend vertically upwards and are formed as a coil or spiral. This ensures a better heat transfer for the preheating of the process gas prior to reforming and provides at the same time a compact reactor design as the same heat transfer area as for instance a straight tube can be accommodated in a lower height. Furthermore, the use of a coil or spiral imparts a centrifugal effect on the two-phase flow (gas-liquid) thereby enabling backflow of any liquid not yet evaporated and facilitating the upward flow of process gas.

Preferably the at least one process tube extends from a transition compartment in the boiler section of the reactor to the reforming section in order to ensure that the process gas is heated to the proper reaction temperature in the reforming section.

In the invention it is also possible to extend the at least one process feed tube into a transition compartment located in the combustion section for example in a flue gas region just underneath the boiler section.

In this specification the term "hydrocarbon feedstock" is used interchangeably with the term "process fluid" or "feed process fluid". Normally, the feed inlet to the reactor, for example a mixture of methanol and water is present in liquid form whereas when entering into the reforming section it is present in gas form. When entering the reactor, the hydrocarbon feed is also referred as process fluid and after evaporation in the process tube the resulting fluid is also referred as process gas. The term "process feed tube" as used herein refers to the at least one tube carrying the process fluid and which enters the transition compartment. The tubes protruding from the transition compartment and carrying the evaporating gas that is directed to the reforming section are referred simply as "process tubes".

In another embodiment of the invention the at least one process feed tube carrying the process fluid to be converted enters the reactor through a conduct arranged in the outer wall of the reactor and said process fluid is preheated by indirect contact (i.e. across a heat transfer surface) with exiting converted gas from the reforming section of the reactor, in which said exiting converted gas preferably passes in the annular region of said conduct. Normally the PSA unit downstream requires a relatively cold stream of hydrogen-rich gas and accordingly cooling means such as an air cooler downstream the reactor is used. Hence, this embodiment enables the reformed gas from the reactor (hydrogen-rich gas) to be cooled from normally about 280° C., which is typical for the reforming of methanol to about 150° C., thereby reducing the effect required in the air cooler downstream and accordingly also reducing its size. The portion of the at least one process tube carrying the process fluid which is in contact with the exiting converted gas from the reforming section may advantageously be formed as a coil to ensure an even more compact reactor design without too noticeable protruding parts. Said conduct is preferably located in the upper portion of the reactor, e.g. near its top. In an alternative embodiment, an outlet tube carries the exiting converted gas and runs parallel with the process feed tube inside said conduct.

In the combustion section arranged preferably in the lower portion of the reactor and below the boiler section, a suitable fuel, such as methanol is injected through a fuel inlet and is subjected to a reaction with preheated combustion air in the at least one burner. Hot flue gases are produced by the exothermic oxidation of methanol and are then passed to the boiler section. The tubes carrying said flue gases may extend vertically from the combustion section into the boiler section and their outlets may then protrude from said boiler section towards an annular section of the reactor.

The boiler section is contained within a compartment or common volume in which a gas-liquid system, preferably a saturated gas-liquid mixture, such as a saturated water-steam mixture, self-circulates. The compartment contains one or more tubes through which hot flue gas from a combustion section arranged below passes. The hot flue gas supplies heat to the gas-liquid mixture thereby evaporating part of the liquid and promoting its circulation upwards internally in the reactor. Part of the heat in the gas-liquid mixture is also delivered to the at least one process tube carrying the gas or liquid or gas-liquid mixture to be converted, e.g. methanol-water. The process tubes extend away from the boiler section and upwardly through the middle portion of the reactor and further up to the reforming section inside which one or more vertical catalyst tubes are disposed. The reforming section is also contained within the same compartment or common volume as the boiler section, but is preferably arranged separately in the upper portion of the reactor. Hence, said boiler and reforming section are both contained within a common volume. The term catalyst tube means that these tubes are filled with solid catalyst particles suitable for the reforming of a given hydrocarbon feedstock, such as a mixture of methanol and water.

Prior to reforming, the process gas to be reformed leaves the process tubes at a suitable position in the reformer section, preferably above the one or more catalyst tubes. The one or more catalyst tubes are normally arranged as a plurality of circumferentially and radially spaced catalyst tubes. Often the number of catalyst tubes is over 5 or 20, more often over 50 and even above 100 or 200 depending on the hydrogen capacity of the reactor. The process gas to be reformed enters the catalyst tubes and flows downwards through the catalyst particles so as to be gradually converted along its passage through the catalyst tubes. The heat required for the reforming reaction is provided by the gas-liquid mixture which self-circulates outside said catalyst tubes. As the gas-liquid mixture delivers heat to the catalyst tubes, the gas condenses and via gravity is forced to flow downwards to the boiler section. The gas-liquid mixture acting as heat exchanging medium moves therefore inside the reactor in a self-circulating manner in a region which is encapsulated inside said common volume containing the boiler section and the reforming section. This enables the continuous circulation of the gas-liquid mixture through said boiler section and said reforming section inside the reactor.

It would therefore be understood that the gas-liquid mixture self-circulates outside the at least one process feed tube, outside the at least one process tube carrying the process gas to be converted, outside the tubes carrying the flue gas, and outside the one or more catalyst tubes in a hermetically sealed compartment. The gas or liquid in the mixture, for instance steam when the mixture is a saturated water-steam mixture, is not utilised for other purposes other than as heat transfer medium as described above.

Preferably at least said reforming and boiler sections are arranged co-axially in the reactor so as to be able to fit into an outer substantially cylindrical housing. Accordingly, in one embodiment said combustion, reforming and boiler sections are arranged co-axially in the reactor. In another embodiment the reforming and boiler section may be arranged co-axially in the reactor, while the combustion section may be arranged normal to said boiler section so as to form an L-shaped reactor. This enables a lower length in the reactor and may facilitate its transport under circumstances where reactor length is a limiting factor.

Said reforming section is preferably arranged in series with respect to the boiler section in which the at least one process tube carrying the process gas and optionally the at least one process feed tube carrying the process fluid inlet are disposed co-axially. The boiler section is preferably arranged in series with respect to a combustion section, which apart from the one or more burners may also comprise a fuel inlet for the introduction of a suitable fuel, preferably methanol, and optionally a co-axially arranged fuel inlet for the introduction of another fuel, which is preferably off-gas from the PSA unit or any other off-gas from a hydrogen enrichment step. Typically during normal operation of the reactor, the off-gas from the PSA serves as main fuel, whereas methanol serves as supporting fuel, whereas upon a start-up it is methanol that serves as the main fuel. The use of off-gas from the PSA unit and optionally the anode off-gas from the fuel cell enables better overall thermal efficiency in for instance a fuel cell plant comprising said reactor and said accompanying PSA unit.

The combustion section of the reactor is also provided with at least one burner. Because of the requirement of reactor compactness the number of burners is kept at a minimum. Preferably a single burner is provided; more preferably a single catalytic burner is provided. The catalytic burner may be a ceramic hollow cylinder with oxidation catalyst on its outer surface to which fuel gas premixed with air is supplied internally. The catalytic burner is preferably a burner arranged in a flow channel and provided as wire mesh layers arranged in series which are coated with ceramic and impregnated with an oxidation catalyst. The heat generated in the combustion is transferred by a convection mechanism to the self-circulating gas-liquid system via the generated flue gas. Accordingly, in another embodiment of the invention, in the reactor said combustion section is provided with a single catalytic burner and wherein said catalytic burner is provided as wire mesh layers arranged in series which are coated with ceramic and impregnated with an oxidation catalyst, whereby the heat generated in the combustion is transferred by a convection mechanism to the self-circulating gas-liquid mixture via the generated flue gas. This enables a better transfer of heat than in for instance systems in which heat transfer occurs by a radiation mechanism, while at the same time enables a compact reactor design since only a single burner is used.

In another embodiment of the invention said reforming section and boiler section are substantially surrounded by an insulated housing, wherein said insulated housing is encased by a first annular region carrying flue gas and a second annular region carrying combustion air. This enables a low heat loss to the surroundings since the hotter parts within the main body of the reactor containing the reforming section, combustion section and the common volume carrying the gas-liquid system serving as heat exchanging medium is encased by first an insulated housing, then a sleeve through which flue gas is passed and finally a second (outer) annular region carrying combustion air to be used in the burner. This may also enable that combustion gas and any other suitable fuel gas, such as off-gas from a hydrogen-purification unit downstream, be preheated by indirect heat exchange with the flue gas, which preferably runs counter-currently on its way out of the reactor. In a preferred embodiment, the flue gas enters into said first annular region directly from the boiler section via an annular region outside said boiler section. This annular region is fed with flue gas by means of tubes carrying this gas that protrude from the boiler section. The flue gas may also enter into said first annular region directly from the combustion section of the reactor, whereby a higher temperature in the flue gas may be effected.

By the term "substantially surrounded by an insulated housing" as used herein is meant that some portions of the reactor may not be insulated. For instance it is possible that part of the reforming section does not require insulation. It is also possible that a small portion of the reforming or boiler section is not surrounded by said insulated housing. For instance, the insulated housing may not cover the lower portion of the boiler section closest to the combustion section.

The reactor may be adapted to cooperate with a Pressure Swing Adsorption unit (PSA), which is the preferred hydrogen-purification unit for the further treatment of the reformed process gas leaving the reactor. As mentioned above, the off-gas from the PSA unit may be utilised in the reactor as fuel. Hence, in yet another embodiment of the invention an inlet is adapted to said second annular region carrying combustion air for the passage of PSA off-gas. This enables the preheating of said off-gas prior to introduction into the at least one burner in the combustion section.

Instead of a PSA-unit a Pd-alloy membrane may also be used to enrich the reformed process gas. Normally a higher degree of purity may be obtained by using Pd-alloy membranes which may be incorporated into the reactor. Accordingly, in the invention it is also possible that a hydrogen purification unit, such as a Pd-alloy membrane is integrated within the reactor. However, a PSA purification unit is still preferred as it is less sensitive and more inexpensive than Pd-alloy membranes. Normally a Pd-alloy membrane requires also a relatively high temperature in the reformed gas for instance about 350° C. Hence, in methanol reforming the reformed gas leaving the reactor at about 300° C. will require heating in order to conform to the requirements of a Pd-alloy membrane. Other hydrogen enrichment units such as conventional water-gas shift step, e.g. low shift and the selective oxidation of carbon monoxide in what is also referred as Preferential Oxidation (PROX) of carbon monoxide, may advantageously be used particularly in connection with fuel cells. The water-gas shift and PROX steps enable the removal of carbon monoxide from the reformed hydrogen-rich gas. This results in an increase in the efficiency of electrochemical reactions in proton exchange membrane (PEM) fuel cells, since carbon monoxide adsorbed in the Pt anode of the PEM fuel cell inhibits the dissociation of hydrogen to protons and electrons and consequently strongly reduces the power output or performance of the PEM fuel cell.

The second annular region of the reactor carrying the combustion air is preferably connected to the combustion section. Accordingly, said second annular region may preferably extend into the combustion section in order to ensure that the preheated combustion air enters into the burner together with the inlet fuel, which preferably is methanol and the other fuel, which preferably is off-gas from the PSA unit. It would be understood that instead of air, any other suitable oxidant, such as oxygen enriched air, may be used.

The gas-liquid mixture is preferably a saturated steam-water system that self-circulates at a pressure of about 55 to 110 bar g, preferably 65 to 110 bar g and a temperature of 270° C. to about 320° C., preferably 280° C. to about 320° C. Most preferably the saturated steam-water system self-circulates at a pressure of 65 bar g and a temperature of 280° C. It would be understood that the temperature is determined by the saturated steam pressure in the circulating system, in this case 280° C. where the pressure of the saturated steam-water system is 65 bar g. Accordingly, the saturated steam-water system may also self-circulate at a pressure of 110 bar g and a temperature of about 320° C., or at a pressure of 55 bar g with a temperature of 270° C. The saturated steam-water system enables the provision of a self-circulating system in which the temperature required in the reforming section for the conversion of methanol to hydrogen, for example 280° C., is easily achieved. The above pressures and temperatures are particularly suitable when the process gas to be reformed comprises methanol, for example a mixture of methanol and water, since the reforming of methanol normally occurs in the temperature range of 250-350° C. Accordingly, in another embodiment of the invention the process fluid entering the reactor is a mixture of methanol and water and the gas-liquid mixture is a saturated steam-water system circulating at a pressure of 55 to 110 bar g and a temperature of 270° C. to about 320° C. (more specifically 318° C.). The high heat capacity of the saturated steam-water system enables therefore the provision of a large heat sink in the reactor. Heat is accumulated and ready to be used when the circumstances, e.g. changes in reactor operation or burner duty, so require it. Heat is distributed throughout the reactor by the self-circulating steam-water system, in which water is vaporized by heat exchange with hot flue gas from the catalytic burner, while steam condenses where heat is consumed.

In yet another embodiment the process fluid entering the reactor contains dimethyl ether (DME). DME is normally obtained by the dehydration of methanol. The process fluid entering the reactor may thus comprise methanol, DME or a mixture of DME and methanol.

When utilizing DME as process fluid the decomposition of DME to hydrogen proceeds by a two step reaction. In a first reaction the ether is hydrated to methanol by the reaction:

$$CH_3OCH_3 + H_2O \rightleftharpoons 2CH_3OH \qquad (1)$$

and methanol produced during hydration of DME is in a second step decomposed to carbon oxides and hydrogen:

$$CH_3OH + H_2O \rightleftharpoons CO_2 + 3H_2 \qquad (2)$$

$$CO_2 + H_2 \rightleftharpoons CO + H_2O \qquad (3)$$

Both reactions may take place in gas and liquid phase.

Reaction (1) proceeds in the presence of weak acids at a very low reaction rate and the reaction is thermodynamically unfavourable to methanol. Methanol decomposition by the above reactions (2) and (3) is known to be catalyzed by a solid catalyst, usually based on copper, zinc and aluminum oxides. Thermodynamically it is favoured by high temperature, low pressure and high steam concentration.

The reaction rate during hydration of DME to methanol by reaction (1) may be improved significantly by carrying out the reaction in presence of a solid acid as described in U.S. Pat. No. 5,837,217. The overall reaction of DME to hydrogen rich gas by the reaction $CH_3OCH_3 + 3H_2O \rightleftharpoons 2CO_2 + 6H_2$ proceeds at reasonable reaction rates and at high product yield and selectivity for the formation of hydrogen and carbon oxides, when overcoming the equilibrium limitations of DME hydration reaction (1) by removing produced methanol as it forms through the reaction of methanol to hydrogen and carbon oxides according to the above reactions (2) and (3). The dimethyl ether is therefore preferably reacted with water in presence of an ether hydration catalyst selected from the group of solid acids and a methanol decomposition catalyst being arranged in physical admixture within the catalyst tubes in the reactor. A suitable catalyst for the hydration of dimethyl ether is any of the solid acids. Preferably, the hydration catalyst comprises acidic zeolites, most preferably ZSM-5 in its H-form. The DME hydration catalyst is physically admixed with the methanol decomposition catalyst of, preferably, Cu—Zn-alumina in a weight ratio of between 1:5 and 5:1.

On the process fluid side, the pressure is kept at a lower level, normally in the range of 3 to 30 bar g, such as 20 to 30 bar g. For instance the pressure of the process fluid entering the reactor, here a liquid mixture of methanol and water, may be about 22 bar g and its temperature in the range 0° C. to 50° C., while in the reformed gas leaving the reactor the pressure may be slightly lower, for example 20 bar g and the temperature in the range 120° C. to 270° C. The hydrogen production from the reactor (exiting reformed gas) is normally in the range 10-5000 $Nm^3/h$, often 15-1000 $Nm^3/h$, preferably 25-1000 $Nm^3/h$, more preferably 25-500 $Nm^3/h$. Normally the composition of said reformed gas is about 65% vol. $H_2$, 11% vol. $H_2O$, 2.1% vol. CO, 23% vol. $CO_2$ and 1.4% vol. methanol. The methanol conversion in the reactor is normally above 90%, often above 95%, for example 97 to 99%. For a reactor having a hydrogen capacity (production) of 600 $Nm^3/h$ the number of catalyst tubes is normally in the range 110-120. The catalyst tubes are normally 2.5 to 3.0 m long and with internal diameter of 20 mm. The temperature in the reactor across the catalyst tubes in the reforming section is kept at a uniform level, for instance at 280° C., and this level is determined by the saturated steam pressure in the circulating system, in this case 65 bar g. For higher temperature applications, the self-circulating system may comprise sodium or potassium instead of a water-steam mixture.

The reactor may further comprise a fixed bed of catalyst arranged above said catalyst tubes, in which said fixed bed covers substantially the whole horizontal cross section of the reactor and wherein said fixed bed is adapted to receive the process gas to be converted prior to the passage of said gas into said catalyst tubes. The fixed bed of catalyst may surround the one or more process tubes carrying the process gas to be converted. Accordingly, the fixed bed is arranged upstream the one or more catalyst tubes of the reforming section. The one or more process tubes carrying the process gas extends through the fixed bed and may protrude slightly away from the bed. The process tubes may thus be provided with an outlet opening right above the fixed bed to allow the passage of process gas through said bed and subsequently through the catalyst beds inside the one or more catalyst tubes. The fixed bed of catalyst covering substantially whole horizontal cross section of the reactor serves as a poison guard catalyst layer and enables often that the process gas flows into the catalyst tubes downstream evenly and consequently better temperature distribution across the horizontal cross section of the reactor is achieved.

It would be understood that the integrated and compact reactor according to the invention integrates in a single unit a number of process units or steps which may otherwise require stand-alone operation outside the reactor, such as heaters for the preheating and evaporation of the hydrocarbon feedstock, preheating of combustion air and optionally preheating off-gas from a PSA unit, as well as catalytic burners and the common volume encapsulating said gas-liquid mixture (gas-liquid system) serving as heat exchanging medium. The reactor does not require the use of moving parts such as valves and pumps, for instance it is not necessary to have a pump to provide for the internal circulation of the gas-liquid mixture serving as heat exchanging medium inside the reactor.

In a second aspect the invention encompasses also a process for the production of hydrogen. Accordingly, we provide a process for the production of hydrogen from a feed process fluid in a reactor containing a combustion section, a boiler section and a reforming section as described herein, the process comprising:

optionally preheating a feed process fluid by indirect heat exchange with exiting reformed process gas from said reforming section, optionally further heating and evaporating said feed process fluid in the reactor to form a preheated process gas by indirect heat exchange with a gas-liquid mixture that self-circulates and is encapsulated inside a common volume containing said reforming section and said boiler section, passing a preheated process gas through said reforming section, heating the at least one catalyst tube in the reforming section by indirect heat exchange with a gas-liquid mixture that self-circulates and is encapsulated inside a common volume containing said reforming section and said boiler section, retrieving reformed process gas from said reforming section and optionally cooling said reformed process gas by preheating of the feed process fluid, introducing a fuel into the at least one burner in the combustion section together with combustion air, in which said combustion air is preheated by indirect heat exchange with flue gas from the boiler section, retrieving flue gas from the burner and passing said flue gas through a boiler section, and heating said gas-liquid mixture that self-circulates and is encapsulated inside a common volume in the reactor containing said reforming section and said boiler section by indirect heat exchange with the flue gas passing through said boiler section.

The process enables the production of reformed process gas which is rich in hydrogen and which is particularly suitable for use in PSA-units. Alternatively, where a Pd-alloy membrane or similar is used as hydrogen-purification unit instead of a PSA, further heating of the reformed process gas may advantageously be effected by means of indirect heat exchange with flue gas. The hydrogen-purification unit may thus be a membrane which may also be integrated within the reactor.

The fuel introduced into the at least one burner in the combustion section together with combustion air may be a hydrocarbon fuel, such as methanol, but is often only off-gas from a PSA-unit downstream used as hydrogen-enrichment unit.

The above process may further comprise the steps of:

passing the cooled reformed process gas through an air cooler, subsequently passing said cooled reformed process gas through a hydrogen-purification unit to form a hydrogen-enriched gas, and introducing off-gas from said hydrogen-purification unit into the at least one burner of the reactor.

Where the hydrogen-purification unit is a PSA-unit, this unit and the air cooler are preferably located outside the reactor. The off-gas from the PSA unit may then be introduced into the at least one burner, as described above. The hydrogen-enriched gas from the hydrogen-purification unit may then be used for any suitable industrial application, such as in the metallurgical industry, electronics, chemical and pharmaceutical industry or as hydrogen source in fuel cell plants.

BRIEF DESCRIPTION OF THE DRAWINGS

The invention is further illustrated by the accompanying drawing in which the sole FIGURE shows a schematic of the reactor according to one embodiment of the invention for production of 25-1000 Nm$^3$/h of hydrogen for use with a PSA-unit.

DETAILED DESCRIPTION OF THE PREFERRED EMBODIMENT

In the FIGURE a cylindrical integrated reactor 1 with capacity of 80 Nm$^3$/h of hydrogen contains a combustion section 2, boiler section 3 and reforming section 4. The cylindrical reactor 1 has a total weight of 300 kg and is about 1.6 m high, with a diameter (except for the combustion section) of about 0.4 m. The total volume of the reactor is about 0.275 m$^3$ while the total catalyst volume is 0.020 m$^3$.

The reforming section 4 encompasses also a fixed bed of reforming catalyst 5 arranged above the region of the reforming section in which catalyst tubes are disposed. These sections are arranged co-axially in the reactor so as to be able to fit into an outer substantially cylindrical housing.

A mixture of methanol and water is introduced to reactor 1 through a conduct 6 in the outer wall of the reactor. Through the conduct 6 runs a process feed tube 7 carrying the process fluid (methanol and water mixture). The process tube extends vertically downward to boiler section 3.

The boiler section is arranged in a compartment or common volume 8 inside which a saturated water-steam mixture 9 self-circulates here illustrated by the hatched region. The saturated water-steam mixture moves therefore inside the reactor in a self-circulating manner in a region which is encapsulated inside said common volume 8 containing the boiler section and the reforming section. The compartment or common volume 8 contains one or more tubes 10 through which hot flue gas 11 from the combustion section 2 arranged below passes. In combustion section 2 arranged in the lower portion of the reactor below the boiler section 3, a suitable fuel such as methanol is injected through fuel inlet 12 which is adapted as a spray nozzle. Methanol is then subjected to a reaction with preheated combustion air entering via inlet 13 in a single catalytic burner 14 comprising wire meshes impregnated with oxidation catalyst and which is disposed in a flow channel co-axially of the cylindrical reactor 1. Hot flue gases 11 are produced and are then passed to boiler section 3. The tubes 10 carrying said flue gases extend vertically from combustion section 2 into boiler section 3 and their outlets 15 protrude towards an annular section 16 of the reactor.

In boiler section 3 within common volume 8 part of the heat in the saturated water-steam mixture 9 is delivered to a system of process tubes 17. The process tubes 17, here formed as a coil or spiral extend away from a transition compartment 18 in boiler section 3 and upwardly through the middle portion of the reactor and further up to the reforming section 4. The reforming section 4 inside which one or more vertical catalyst tubes 19 are disposed is arranged in the compartment or common volume 8 in the upper portion of the reactor. The process gas to be reformed travelling inside process tubes 17 leaves above the fixed bed of catalyst 5, passes through this bed and enters the catalyst tubes 19. The reformed gas leaves the reforming section through outlet pipe 20 at the bottom of the catalyst tubes 19 and is used to preheat the hydrocarbon feed being transported inside process feed tube 7 in conduct 6 at the outer wall of the reactor.

The reforming section 4, 5 and boiler section 3 are surrounded by an insulated housing 21. This insulated housing 21 is encased by a first annular region 22 carrying flue gas and a second annular region 23 carrying combustion air which enters via inlet 13. The combustion air is preheated by indirect heat exchange with the flue gas 11 running counter-currently in annular section 22 towards the flue gas exit 24. The combustion section 2 is also surrounded by a separate insulated housing 25. Off-gas from a PSA-unit downstream is also used as fuel and enters via inlet 26 to the burner 14. The flue gas 11 enters into said first annular region 22 directly from the boiler section via an annular region 27 outside said boiler section. The second annular region 23 carrying the combustion air is connected to the combustion section 2 via narrow passageway 28.

The invention claimed is:

1. A reforming reactor for the conversion of a process fluid into hydrogen comprising:
a reforming section and a boiler section which are both contained within a common closed volume and a combustion section, in which said reforming section contains one or more catalyst tubes filled with reforming catalyst, said boiler section is provided with one or more tubes carrying flue gas from the combustion section and said combustion section is provided with at least one burner, wherein the heat exchanging medium required for the reforming of said process fluid in the one or more catalyst tubes is a gas-liquid mixture that self-circulates outside said one or more catalyst tubes and without passing inside said one or more catalyst tubes, and wherein the heat exchanging medium is encapsulated inside said common volume containing said reforming and boiler sections, wherein at least a portion of said closed volume protrudes inside said boiler section, wherein the process fluid entering the reactor comprises methanol, DME or a mixture of DME and methanol, and wherein the gas-liquid mixture is a saturated steam-water system circulating at a pressure of 55 to 110 bar g and a temperature of 270° C. to about 320° C.

2. The reactor according to claim 1, in which at least one process feed tube carrying the process fluid to be converted extends inside said common volume of the reactor.

3. The reactor according to claim 2, in which the at least one process feed tube carrying the process fluid to be converted enters the reactor through a conduct arranged in the outer wall of the reactor and wherein said process fluid is preheated by indirect contact with exiting converted gas from the reforming section of the reactor.

4. The reactor according to claim 2, in which said at least one process feed tube extends vertically into a transition compartment from which at least one process tube carrying process gas to be converted extends vertically inside the common volume of the reactor and wherein the at least one process tube carrying the process gas is formed as a coil.

5. The reactor according to claim 1 in which said common volume containing said reforming section and boiler section are substantially surrounded by an insulated housing, wherein said insulated housing is encased by a first annular region carrying flue gas and a second annular region carrying combustion air.

6. The reactor according to claim 1, wherein said combustion section is provided with a single catalytic burner and wherein said single catalytic burner is provided as wire mesh layer arranged is series which are coated with ceramic and impregnated with an oxidation catalyst, whereby the heat generated in the combustion is transferred by a convection mechanism to the self-circulating gas-liquid mixture via the generated flue gas.

7. The reactor according to claim 1, further comprising a fixed bed of catalyst arranged above said catalyst tubes, in which said fixed bed covers substantially the whole horizontal cross section of the reactor and wherein said fixed bed is adapted to receive the process gas to be converted prior to the passage of said gas into said catalyst tubes.

8. A process for the production of hydrogen from a feed process fluid in a reactor containing a combustion section, a boiler section and a reforming section according to any preceding claim, the process comprising:
- passing a preheated process gas through said reforming section;
- heating the at least one catalyst tube in the reforming section by indirect heat exchange with a gas-liquid mixture that self-circulates and is encapsulated inside a common volume containing said reforming section and said boiler section;
- retrieving reformed process gas from said reforming section and optionally cooling said reformed process gas by preheating of the feed process fluid;
- introducing a fuel into the at least one burner in the combustion section together with combustion air, in which said combustion air is preheated by indirect heat exchange with flue gas from the boiler section;
- retrieving flue gas from the burner and passing said flue gas through a boiler section; and
- heating said gas-liquid mixture that self-circulates and is encapsulated inside a common volume in the reactor containing said reforming section and said boiler section by indirect heat exchange with the flue gas passing through said boiler section,
wherein the gas-liquid mixture self-circulates outside the at least one catalyst tube and without passing inside said one or more catalyst tubes, wherein the process fluid entering the reactor comprises methanol, DME or a mixture of DME and methanol, and wherein the gas-liquid mixture is a saturated steam-water system circulating at a pressure of 55 to 110 bar g and a temperature of 270° C. to about 320° C.

* * * * *